United States Patent [19]

Malpass, Jr.

[11] Patent Number: 5,021,382

[45] Date of Patent: Jun. 4, 1991

[54] DIENE ACTIVATED ZIEGLER TRANSITION METAL CATALYST COMPONENTS FOR ETHYLENE POLYMERIZATION

[75] Inventor: Gerald D. Malpass, Jr., Clearwater, Canada

[73] Assignee: Exxon Chemical Patents Inc., Linden, N.J.

[21] Appl. No.: 486,572

[22] Filed: Feb. 28, 1990

[51] Int. Cl.$^5$ .................. C08F 4/654; C08F 4/656; C08F 4/68

[52] U.S. Cl. ................... 502/117; 502/119; 502/125; 502/108; 502/109; 502/120

[58] Field of Search ............. 502/108, 109, 117, 119, 502/120, 125

[56] References Cited

U.S. PATENT DOCUMENTS

| | | | |
|---|---|---|---|
| 4,558,024 | 12/1985 | Best | 501/115 |
| 4,558,025 | 12/1985 | Best | 502/115 |
| 4,564,606 | 1/1986 | Best | 502/117 |
| 4,639,428 | 1/1987 | Best | 502/115 |
| 4,640,907 | 2/1987 | Best | 502/115 |
| 4,711,865 | 12/1987 | Speca | 502/116 |
| 4,851,378 | 7/1989 | Malpass et al. | 502/103 |

*Primary Examiner*—Patrick P. Garvin
*Assistant Examiner*—B. Peebles
*Attorney, Agent, or Firm*—T. Dean Simmons

[57] ABSTRACT

High density polymers of ethylene are produced in improved yields employing a solid Ziegler type transition metal-containing catalyst component and an organoaluminum cocatalyst in the presence of a small amount of an aliphatic diene having at least 4 carbon atoms and a terminal double bond. The amount of diene is from about 0.01 to about 3000 mole per gram atom of transistion metal in the catalyst component. The catalyst component variously may be pretreated with the diene before using the component for homopolymerization, may be prepolymerized with ethylene in the presence of the diene, may be prereduced in the presence of the diene, or the diene may be added to the polymerization reaction. Preferred dienes are α-ω-dienes.

40 Claims, No Drawings

DIENE ACTIVATED ZIEGLER TRANSITION METAL CATALYST COMPONENTS FOR ETHYLENE POLYMERIZATION

BACKGROUND

1. Field of the Invention

This invention relates to novel activated Ziegler catalyst compounds employed with co-catalyst for the polymerization of ethylene under essentially homopolymerization conditions, especially to produce linear high density polyethylenes. More particularly, this invention relates to activated Group IVb, Vb, VIb, or VIII transition metal-based catalyst components comprising a solid reaction product obtained by treating a solid, particulate inert support material, in stages, with at least (i) an organometallic composed of a Group IIa, IIb or IIIa metal, (ii) an oxygen containing compound selected from ketones, aldehydes, siloxanes, alcohols or mixtures thereof, (iii) optionally an acyl halide, and (iv) a transition metal compound.

2. Background Art

As is well known, high density polyethylene is a linear polymer with a density $\geq 0.94$ g/cc and a melting point of about 136° C., made by coordination with Ziegler or Phillips type catalysts, discussed below. Many intermediate density polyethylenes ranging down to about 0.94 density are prepared for various applications by modification of the conditions used for manufacture of the higher density product. For example, controlled amounts of branching of the polymer chain are generated by introduction of terminal olefin (1-olefin) comonomers such as 1-butene or 1-hexene.

Essentially there are two general families of ethylene polymerization catalysts. Generally speaking the Ziegler catalysts historically are prepared by reaction of an aluminum alkyl compound with $TiCl_4$ or $TiCl_3$ to give compositions sometimes soluble in hydrocarbon solvents. The Phillips catalysts are insoluble materials historically prepared by deposition of chromium oxides on silica. This invention relates to Ziegler type catalysts and not to Phillips type catalysts.

Colloidal Ziegler catalysts conventionally are prepared by reaction of $TiCl_4$ with trialkylaluminum compounds in cyclohexane or heptane, which alkylates the titanium compound and reduces it to the trivalent state in the form of a brown floc. Insoluble Ziegler catalysts conventionally are prepared from crystalline $TiCl_3$. In commercial solution- or slurry-polymerization practice, the catalyst solution or slurry is fed along with ethylene and a hydrocarbon diluent into reactor vessels. In solution processes, the hydrocarbon diluent used, suitably cyclohexane, is a solvent for the polyethylene; in slurry processes, the diluent used, suitably hexane or a light naphtha, is a poor solvent for the polyethylene. In solution polymerization, polymer content of the solution is limited by the viscosity that can be handled, which as a practical matter limits the molecular weight that can be allowed. In the more widely practiced slurry polymerization, the polymer is obtained as a powder, and a high molecular weight material is easily produced. Hydrogen is often used to control the degree of polymerization. Typical operating conditions employ relatively low pressures (10-30 atm.) and temperatures (80° C. to 200° C.). These processes need large reactors and expensive equipment for solvent recovery and drying. The need for solvent recovery and drying equipment is eliminated by gas phase ethylene polymerization, in which no hydrocarbon diluent is required. Instead, ethylene and catalyst in the form of dry powder are fed continuously to a fluidized bed reactor where polymerization takes place at reaction pressures of typically about 20 atm. and at temperatures typically in the range of 85° C.-100° C. A problem with gas phase ethylene polymerization is accurate temperature control of the highly exothermic polymerization reaction in the absence of any hydrocarbon diluent, and associated reactor fouling. A vital requisite to all these processes employing Ziegler type catalysts is high catalytic activities giving yields which avoid the costly process of removing the solid catalyst from the polymer after the reaction, called de-ashing.

Recently, solid catalyst components for use in Ziegler type polymerization with alkyl aluminum co-catalysts have been developed that have (i) high catalytic activities, for efficient yields and good productivity which eliminate de-ashing, (ii) good comonomer incorporation, for producing resins with differing product properties, including density regulation, and (iii) high hydrogen responsiveness, for the control of molecular weight. These catalyst components are described, inter alia, in U.S. Pat. Nos. 4,558,024; 4,558,025; 4,564,606; 4,565,797; 4,634,746; 4,634,747; 4,634,748; 4,634,749; 4,639,428; 4,640,907; and 4,711,865.

In these patents as a group, the catalyst component comprises a solid reaction product obtained by treating an inert solid support material, suitably a particulate, porous material, for example, silica, alumina, magnesia or mixtures thereof, for example silica-alumina, in an inert solvent, in stages, with (A) optionally, $Cl_2$, $Br_2$, an interhalogen, or mixtures thereof (U.S. Pat. Nos. 4,564,606; 4,634,747), (B) an organometallic compound of a Group IIa, IIb or IIIa metal wherein all the metal valencies are satisfied with a hydrocarbyl group (all the aforecited patents), (C) an oxygen-containing compound selected from alcohols, aldehydes, ketones, siloxanes, or mixtures thereof (all the aforecited patents), (D) optionally, an acyl halide (U.S. Pat. Nos. 4,558,024; 4,564,606; 4,634,747; 4,711,865; 4,558,025; 4,634,749; 4,640,907; 4,639,428), (E) optionally one or more halogen containing compounds selected from chlorosilanes, $Cl_2$, $Br_2$, an interhalogen, or mixtures thereof (U.S. Pat. Nos. 4,634,746; 4,565,797), (F) at least one transition metal compound of a Group IVb, Vb, VIb or VIII metal (all the aforecited patents), (G) optionally, $Cl_2$, $Br_2$, an interhalogen, or mixtures thereof (U.S. Pat. Nos. 4,564,606; 4,634,747; 4,711,865), (H) optionally, a Group IIIa metal hydrocarbyl dihalide (U.S. Pat. Nos. 4,558,025; 4,634,749; 4,640,907; 4,639,428; 4,634,748), (I) optionally, $Cl_2$, $Br_2$, an interhalogen, or mixtures thereof (U.S. Pat. No. 4,639,428), and (J) optionally, an organometallic compound of a Group IIa, IIb or IIIa metal (U.S. Pat. Nos. 4,634,746; 4,634,749; 4,639,428).

In U.S. Pat. No. 4,558,024, optional step (D) but none of optional steps (A), (E), (G), (H), (I) or (J) is involved.

If steps (D) and (G) are employed, as in U.S. Pat. Nos. 4,564,606 and 4,711,865, then steps (E), (H) and (I) are not employed; and if step (J) is employed, step (A) is not employed, as in U.S. Pat. No. 4,711,865, but if step (J) is not employed, step (A) may be employed.

If step (D) but not step (G) is employed, then as in U.S. Pat. Nos. 4,558,025 and 4,534,749, step (H) is employed and steps (A), (E), and (J) are not employed. Optionally, as in U.S. Pat. No. 4,639,428, step (I) may also be employed, or as in U.S. Pat. No. 4,640,907, the product may be contacted with minor amounts of ethylene to prepolymerize the product.

If step (D) is not employed and if step (J) is employed, then steps (A), (I) and (H) are not employed, as in U.S. Pat. Nos. 4,634,746 and 4,634,747; and if step (E) is performed as in U.S. Pat. No. 4,634,746, unless a chlorosilane is employed in step (E), then step (G) is optional, however, if a chlorosilane is employed in step (E), step (G) is employed.

If step (D) and step (J) are not employed, then step (H) is employed and steps (A), (G) and (I) and (E) are not employed, as in U.S. Pat. No. 4,634,748.

In all the above patents, the inert solid support material can be treated alternatively with (i) simultaneously the (B) organometallic compound and the (C) oxygen-containing compound, (ii) the reaction product of the (B) organometallic compound and the (C) oxygen-containing compound, or (iii) the (C) oxygen-containing compound followed next by the (B) organometallic compound.

For shorthand ease of reference, any of the body of catalyst components encompassed by the foregoing group of patents is sometimes hereinafter referred to as the "solid reaction product catalyst component." These patents are incorporated herein by reference for all purposes, including without limitation for the prior art described in such patents and for details of the specific catalyst component preparation, catalyst systems, and polymerization processes described therein.

In the above cited patents, the solid reaction product catalyst component is used with an aluminum alkyl co-catalyst for the copolymerization of ethylene with other 1-olefins such as propylene, 1-butene, 1-pentene, 1-hexene and 1-octene, or with diolefins such as 1,4-pentadiene, 1,5-hexadiene, butadiene, 2-methyl- 1,3 butadiene, and the like. As mentioned above, terminally unsaturated 1-olefins conventionally are used to prepare reduced density linear polyethylene resins.

For many of these recently developed solid reaction product catalyst components, however, catalytic activity is much lower in the absence of the density lowering 1-olefins such as 1-butene and 1-hexene, and consequently polymerization yields of high density linear polyethylene resins are smaller than copolymerization yields of reduced density linear polyethylene resins.

Although not involving the Ziegler catalyst family of this invention, it may be mentioned that Phillips catalysts have been employed, as disclosed in U.S. Pat. Nos. 4,252,927 and 4,252,928, to polymerize ethylene using diolefins with either trihydrocarbylboron or trihydrocarbyl aluminum.

There yet exists a need for solid reaction product catalysts which are both highly active for the production of high density linear polyethylene resin and which do not significantly lower the density of the polyethylene product.

SUMMARY OF THE INVENTION

This invention relates to the use of small amounts of aliphatic dienes to produce a significant increase in the catalytic activity of the above described Ziegler family of solid reaction product catalysts components without causing a significant reduction in resin density. These aliphatic dienes have at least 4 carbon atoms and at least one of the double bonds is in the terminal position. For example, $\alpha,\omega$-dienes such as 1,7-octadiene, are preferred, and other useful dienes include butadiene, isoprene, 1,5-hexadiene, 1,9-octadiene, cyclopentadiene, ethylidene norbornene, or mixtures thereof.

In accordance with this invention, the aliphatic diene containing at least 4 carbon atoms and having at least one of the double bonds in a terminal position, may be used to pretreat the solid reaction product catalyst component before polymerization; may be added to the polymerization reactions of ethylene with the solid reaction product catalyst component; may be used in the presence of ethylene for prepolymerization of the solid reaction product catalyst component; or the solid reaction product catalyst component may be prereduced in the presence of the diene.

The small quantity of diene employed is in the range from 0.01 to about 3000 mole of diene per gram atom of the transition metal, more preferably from about 500 to about 1500 mole of diene per gram atom of the transition metal. When used to pretreat, prereduce or prepolymerize the solid reaction product catalyst, the diene may be employed in amounts of from 0.01 to about 200 mole of diene per gram atom of the transition metal, and more preferably in amounts of from 0.01 to about 50 moles per gram atom of the transition metal. Wherein the first occasion for reacting the diene with the solid reaction product catalyst is by reason of addition of the diene to a polymerization reactor together with ethylene monomer, since the overall concentration of diene available for reaction with the transition metal is less than when the diene is used to pretreat, prepolymerize or prereduce the catalyst, it is preferred to employ the diene in amounts of from about 200 to about 3,000 mole per gram atom of the transition metal, and most preferably in amounts of from about 500 to about 1,500 mole per gram atom of the transition metal.

More particularly, in accordance with this invention, in one embodiment, there is provided a transition metal-containing catalyst component comprising the reaction product obtained by, step (I), treating an inert solid support material in an inert solvent sequentially with: (A) optionally, $Cl_2$, $Br_2$, an interhalogen, or mixtures thereof, (B) an organometallic compound of a Group IIa, IIb or IIIa metal wherein all the metal valencies are satisfied with a hydrocarbyl group, (C) an oxygen-containing compound selected from alcohols, aldehydes, ketones, siloxanes, or mixtures thereof, (D) optionally, an acyl halide, (E) optionally one or more halogen containing compounds selected from chlorosilanes, $Cl_2$, $Br_2$, an interhalogen, or mixtures thereof, (F) at least one transition metal compound of a Group IVb, Vb, VIb or VIII metal, (G) optionally, $Cl_2$, $Br_2$, an interhalogen or mixtures thereof, (H) optionally, a Group IIIa metal hydrocarbyl dihalide, (I) optionally, $Cl_2$, $Br_2$, an interhalogen, or mixtures thereof, and (J) optionally, an organometallic compound of a Group IIa, IIb or IIIa metal; and then, (II), treating the treated solid from step (I) with from about 0.01 to about 3000 mole of an aliphatic diene per gram atom of the transition metal of step (I)(F), said diene having at least 4 carbon atoms and at least one terminal double bond.

With respect to the optional steps of step (I), a major determinant is whether an acyl halide of step (D) is employed. If (1) an acyl halide of step (D) is employed and (a) if the $Cl_2$, $Br_2$, interhalogen, or a mixture thereof of step (G) is employed, then the halogen containing compound of step (E), the Group IIIa metal hydrocarbyldihalide of step (H) and the $Cl_2$, $Br_2$, interhalogen or a mixture thereof of step (I) is not employed, and (i) if the organometallic compound of Group IIa, IIb, or IIIa of step (J) is employed, then the $Cl_2$, $Br_2$, interhalogen or mixture thereof of step (A) is not employed, but (ii) if the organometallic compound of Group IIa, IIb, or IIIa of step (J) is not employed, then the $Cl_2$, $Br_2$, interhalogen or mixture thereof of step (A) may be employed; but (b) if the $Cl_2$, $Br_2$, interhalogen or a mixture thereof of step (G) is not employed, then the Group IIIa metal hydrocarbyldihalide of step (H) is employed and the $Cl_2$, $Br_2$, interhalogen or a mixture thereof of step (A), the halogen containing compound of step (E), and the organometallic compound of step (J) are not employed.

On the other hand, if (2) an acyl halide of step (D) is not employed, and (a) if the organometallic compound of step (J) is employed, then the $Cl_2$, $Br_2$, interhalogen and a mixture thereof of steps (A) and (I) and the Group IIIa metal hydrocarbyldihalide of step (H) are not employed, and (i) if an addition step (E) is performed, unless chlorosilane is employed in step (E), then the $Cl_2$, $Br_2$, interhalogen or a mixture thereof of step (G) may also be performed, however, (ii) if a chlorosilane is employed in step (E), then $Cl_2$, $Br_2$, interhalogen or a mixture thereof is employed at least in step (G), but (b) if the organometallic compound of step (J) is not employed, then the Group IIIa metal hydrocarbyldihalide of step (H) is employed and the $Cl_2$, $Br_2$, interhalogen or mixtures thereof of steps (A), (G) and (I) and the halogen containing compound of step (E) are not employed.

In any of the optional steps of the step (I) methods of treatment, it is a further provision that the inert solid support material can be treated alternatively (i) simultaneously with the (B) organometallic compound and the (C) oxygen-containing compound, (ii) with the reaction product of the (B) organometallic compound and the (C) oxygen-containing compound, or (iii) with the (C) oxygen-containing compound followed next by the (B) organometallic compound.

The transition metal-containing catalyst component prepared in steps (I) and (II) as just described, hereinafter is sometimes called the "basic catalyst component."

A more preferred embodiment for the basic catalyst component is prepared by (I) treating an inert solid support material in an inert solvent sequentially with: an organometallic compound (B) of a Group IIa, IIb or IIIa metal wherein all the metal valencies are satisfied with a hydrocarbyl group; an oxygen-containing compound (C) selected from alcohols, aldehydes, ketones, siloxanes, or mixtures thereof; an acyl halide; at least one transition metal compound (F) of a Group IVb, Vb, VIb or VIII metal; optionally, (G) $Cl_2$, $Br_2$, an interhalogen, or mixtures thereof; and optionally, an organometallic compound (J) of a Group IIa, IIb or IIIa metal; with the provision that the inert solid support material can be treated alternatively (i) simultaneously with the (B) organometallic compound and the (C) oxygen-containing compound, (ii) with the reaction product of the (B) organometallic compound and the (C) oxygen-containing compound, or (iii) with the (C) oxygen-containing compound followed next by the (B) organometallic compound; and (II) treating the treated solid from step (I) with from about 0.01 to about 200 mole of an aliphatic diene per gram atom of the transition metal of compound (F), said diene having at least 4 carbon atoms and at least one terminal double bond.

Further particularizing as to another embodiment of this invention, a transition metal-containing solid prepolymerized catalyst component is provided, which comprises the solid reaction product obtained by the same step (I) as described above for the basic catalyst component, but treated with a minor amount of ethylene in the presence of from about 0.01 to about 3,000 mole of an aliphatic diene per gram atom of the transition metal of step (I)(F) described above, such diene having at least 4 carbon atoms and at least one terminal double bond. This solid prepolymerized catalyst component is sometimes hereinafter called the "prepolymerized catalyst component."

A more preferred embodiment for the prepolymerized catalyst component is prepared by treating an inert solid support material in an inert solvent sequentially with: (I) an organometallic compound (B) of a Group IIa, IIb or IIIa metal wherein all the metal valencies are satisfied with a hydrocarbyl group; an oxygen-containing compound (C) selected from alcohols, aldehydes, ketones, siloxanes, or mixtures thereof; an acyl halide; at least one transition metal compound (F) of a Group IVb, Vb, VIb or VIII metal; optionally, (G) $Cl_2$, $Br_2$, an interhalogen, or mixtures thereof; and optionally, an organometallic compound (J) of a Group IIa, IIb or IIIa metal; with the provision that the inert solid support material can be treated alternatively (i) simultaneously with the (B) organometallic compound and the (C) oxygen-containing compound, (ii) with the reaction product of the (B) organometallic compound and the (C) oxygen-containing compound, or (iii) with the (C) oxygen-containing compound followed next by the (B) organometallic compound; and (II) treating the treated solid from step (I) with a minor amount of ethylene in the presence of from about 0.01 to about 200 mole of an aliphatic diene per gram atom of the transition metal of compound (F), said diene having at least 4 carbon atoms and at least one terminal double bond.

Further particularizing as to another embodiment of this invention, a transition metal-containing pre-reduced catalyst component comprising the pre-reduced solid product obtained by: (I) treating an inert solid support material in an inert solvent sequentially with (A) optionally, $Cl_2$, $Br_2$, an interhalogen, or mixtures thereof; an organometallic compound (B) of a Group IIa, IIb or IIIa metal wherein all the metal valencies are satisfied with a hydrocarbyl group; an oxygen-containing compound (C) selected from alcohols, aldehydes, ketones, siloxanes, or mixtures thereof; an acyl halide (D); at least one transition metal compound (F) of a Group IVb, Vb, VIb or VIII metal; and optionally, $Cl_2$, $Br_2$, an interhalogen, or mixtures thereof (G), with the provision that at least one of steps (A) and (G) is employed, and with the further provision that the inert solid support material can be treated alternatively (i) simultaneously with the (B) organometallic compound and the (C) oxygen-containing compound, (ii) with the reaction product of the (B) organometallic compound and the (C) oxygen-containing compound, or (iii) with the (C) oxygen-containing compound followed next by the (B) organometallic compound; and (II) pre-reducing the treated solid from step (I) with an organometallic compound of a Group IIa, IIb or IIIa metal in the presence of from about 0.01 to about 3,000 mole of an aliphatic diene per gram atom of the transition metal (F), said diene having at least 4 carbon atoms and at least one terminal double bond. This pre-reduced catalyst component is sometimes hereinafter called the "pre-reduced catalyst component."

In still other embodiments of this invention, catalyst systems are provided for the polymerization of ethylene, which combine (a) either (i) the aforesaid basic catalyst component, (ii) the aforesaid prepolymerized catalyst component or (iii) the aforesaid pre-reduced catalyst component, with (b) an organoaluminum compound of the formula $AlR''_nX_{3-n}$ wherein Al is aluminum, $R''$ is hydrogen or a hydrocarbyl group having from 1 to 20 carbon atoms, X is a halogen and n is a number from 1 to 3.

In still other embodiments of this invention, processes of polymerizing ethylene are provided. One process comprises polymerizing ethylene in the presence of (a) the transition metal-containing solid reaction product obtained in step (I) described above, and (b) from about 0.01 to about 3000 mole, and preferably from about 500 to about 1,500 mole, of the aforesaid aliphatic diene per gram atom of the transition metal of the aforesaid step (I)(F). Another process embodiment comprises polymerizing ethylene in the presence of the aforesaid catalyst system containing the basic catalyst component. Yet another process embodiment comprises polymerizing ethylene in the presence of the aforesaid catalyst system containing the prepolymerized catalyst component. Still another embodiment comprises polymerizing ethylene in the presence of the aforesaid catalyst system containing the pre-reduced catalyst component.

In a preferred embodiment of the invention, involving the basic transition metal-containing solid catalyst component, the prepolymerized solid catalyst component and the pre-reduced solid catalyst component, the (B) organometallic compound is a dihydrocarbon magnesium compound represented by $R^1MgR^2$ wherein $R^1$ and $R^2$ can be the same or different and are selected from alkyl groups, aryl groups, cycloalkyl groups, aralkyl groups, alkadienyl groups or alkenyl groups; the (C) oxygen-containing compound is selected from alcohols and ketones represented by the formula $R^3OH$ and $R^4COR^5$ wherein $R^3$ and each of $R^4$ and $R^5$ may be the same or different and can be an alkyl group, aryl group, cycloalkyl group, aralkyl group, alkadienyl group or alkenyl group; and the transition metal compound or mixtures thereof (F) is represented by the formula $TrX'_{4-q}(OR^6)_q$, $TrX'_{4-q}$, $R_q^7$, $VOX'_3$ or $VO(OR^6)_3$ wherein Tr is a transition metal, $R^6$ is a hydrocarbyl group having from 1 to 20 carbon atoms, $R^7$ is an alkyl group, aryl group or aralkyl group having from 1 to 20 carbon atoms or a 1,3-cyclopentadienyl, X' is halogen and q is 0 or a number equal to or less than 4. In embodiments in which the acyl halide (D) is employed, the acyl halide is represented by the formula $R^8COX$ wherein $R^8$ can be an alkyl group, cycloalkyl group or aryl group having from 1 to 12 carbon atoms and X is a halogen.

As employed in the specification of this invention and in the claims, "(A)", "(B)", "(C)", "(D)", "(E)", "(F)", "(G)", "(H)", "(I)" and "(J)" refer to compounds, and are not mere enumerators of steps, although on some occasions the identifier will coincide with the step sequence and the reference of the identifier will be understood to be to the compound denoted by the identifier although the identifier may be used to indicate a particular step employing the referenced compound.

DESCRIPTION OF THE PREFERRED EMBODIMENTS

Typically, the inert support material can be any of the solid particulate porous supports such as talc, silica, zirconia, thoria, magnesia, and titania. Preferably the support material is a Group IIa, IIIa, IVa and IVb metal oxide in finely divided form. Suitable inorganic oxide materials, which are desirably employed in accordance with this invention include silica, alumina, and silica-alumina and mixtures thereof. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can be advantageously employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material in an inert hydrocarbon solvent, such as, for example, heptane. During the dehydration reaction, the silica should be maintained in a moisture and oxygen-free atmosphere. To the silica slurry is then added a low boiling inert hydrocarbon solution of a chemical dehydrating agent, such as, for example, dichlorodimethylsilane. The solution is added slowly to the slurry. The temperature range during the chemical dehydration reaction can be from about 25° C. to about 120°.C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred organometallic compounds (B) employed in this invention are the inert hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 atoms. Illustrative but nonlimiting examples of magnesium compounds which may be suitably employed in accordance with the invention are dialkylmagnesiums such as diethylmagnesium, dipropylmagnesium, di-isobutylmagnesium, diamylmagnesium, dioctylmagnesium, di-n-hexylmagnesium, didecylmagnesium, and didodecylmagnesium; dicycloalkylmagnesiums, such as dicyclohexylmagnesium; and diarylmagnesiums such as dibenzylmagnesium, ditoluolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butylmagnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are, as generally obtained from commercial sources, mixtures of the magnesium hydrocarbon compounds with a minor amount of an aluminum hydrocarbyl compound, and these mixtures are to be understood herein as comprised within the meaning of the more general term "organometallic compound of a Group IIa, IIb or IIIa metal." The minor amount of aluminum hydrocarbyl is present in order to facilitate solubilization of the organomagnesium compound in a hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylene, etc. The organomagnesium complex with a minor amount of aluminum alkyl can be represented by the formula $(R^1MgR^2)_p(R_3{}^9Al)_s$ wherein $R^1$, $R^2$ are defined as above, $R^9$ has the same definition as $R^1$ and $R^2$, p is greater than 0, and the ratio of s/s+p is from 0 to 1, preferably from 0 to about 0.7 and most desirably from about 0 to 0.1. Illustrative examples of the magnesium aluminum complexes are:

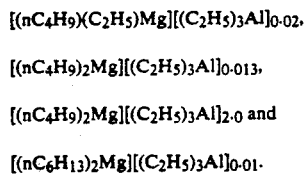

A suitable magnesium aluminum complex is Butyl Ethyl Magala TM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen containing compounds (C) which may be usefully employed in accordance with this invention are alcohols, aldehydes, siloxanes and ketones. Preferably the oxygen containing compounds are selected from alcohols and ketones represented by the formulae $R^3OH$ and $R^4COR^5$ wherein $R^3$ and each of $R^4$ and $R^5$ which may be the same or different and can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms. Illustrative examples of alcohols which may be usefully employed in accordance with this invention are methanol, ethanol, isopropanol, 1-butanol, t-butanol, 2-methyl-1-pentanol, 1-pentanol, 1-dodecanol, cyclobutanol, benzyl alcohol, and the like; diols, such as 1,6-hexanediol, and the like. Most preferably, the alcohol will contain from 1 to 4 carbon atoms. The most preferred alcohol is 1-butanol.

The ketones will preferably have from 3 to 11 carbon atoms. Illustrative ketones are methyl ketone, ethyl ketone, propyl ketone, n-butyl ketone and the like. Acetone is the ketone of choice.

Illustrative examples of the aldehydes which may be usefully employed in the preparation of the organomagnesium compound include formaldehyde, acetaldehyde, propionaldehyde, butanal, pentanal, hexanal, heptanal, octanal, 2-methylpropanal, 3-methylbutanal, acrolein, crotonaldehyde, benzaldehyde, phenylacetaldehyde, o-tolualdehyde, m-tolualdehyde, and p-tolualdehyde.

Illustrative of the siloxanes which may be usefully employed in the preparation of the organomagnesium compound include hexamethyldisiloxane, octamethyltrisiloxane, octamethylcyclotetraloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosiloxanes, polymethylethylsiloxanes, polymethyloctylsiloxanes, and polyphenylhydrosiloxanes.

Any of the acyl halides (D) may be usefully employed in accordance with this invention. The hydrocarbon portion of the acyl halides which can have from 1–20 carbon atoms can be an alkyl group, substituted alkyl group, aryl group, substituted aryl group, cycloalkyl group, alkadienyl group or alkenyl group.

The preferred acyl halides can be represented by the formula $R^8COX$ wherein $R^8$ can be a $C_1$ to $C_{20}$ alkyl group, substituted alkyl group, aryl group, substituted aryl group, or cycloalkyl group and X is a halogen. The preferred halogen is chlorine. Preferably the alkyl group has 1 to 6 carbon atoms and the phenyl or substituted phenyl group has 6 to 10 carbon atoms. Most preferably $R^8$ is a methyl or phenyl group and X is chlorine.

Illustrative but non-limiting examples of the acyl halides which can be employed in this invention are acetyl chloride, propanoyl chloride, butyryl chloride, butyryl bromide, isobutyryl chloride, benzoyl chloride, oleoyl chloride, acryloyl chloride, 6-hepteneoyl chloride, heptanoyl chloride, cyclohexanecarbonyl chloride, cyclopentanepropionyl chloride and the like. Acid chlorides based on polyacids may also be usefully employed such as, for example, dodecanedioyl chloride, succinyl chloride, camphoryl chloride, teraphtaloyl chloride and the like. The preferred acid halides are acetyl chloride, benzoyl chloride, and p-methylbenzoyl chloride.

The transition metal compounds (F) which can be usefully employed in the preparation of the transition metal containing catalyst component of this invention are well known in the art. The transition metals which can be employed in accordance with this invention may be represented by the formulae $TrX'_{4-q}(OR^6)_q$; $TrX'_{4-q}R^7_q$; $VOX'_3$; and $VO(OR^6)_3$. Tr is a Group IVb, Vb, VIb, or VIII metal, preferably Group IVb and Vb metals and preferably titanium, vanadium or zirconium, q is 0 or a number equal to or less than 4, X' is halogen, $R^6$ is a hydrocarbyl or substituted hydrocarbyl group, for example, alkyl, aryl or cycloalkyl having from 1 to 20 carbon atoms and $R^7$ is an alkyl group, aryl group, aralkyl group, substituted aralkyl group, 1,3-cyclopentadienyl and the like. The alkyl, aryl, aralkyls and substituted aralkyls contain from 1 to 20 carbon atoms, preferably 1 to 10 carbon atoms. Mixtures of the transition metal compounds can be employed if desired.

Illustrative examples of the transition metal compounds include:

$TiCl_4$, $TiBr_4$, $Ti(OCH_3)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The halogens of steps (A), (E), (G) and (I) which can be suitably employed are $Cl_2$, $Br_2$, $I_2$ and mixtures thereof. Illustrative interhalogen compounds are ClF, $ClF_3$, BrF, $BrF_3$, $BrF_5$ICl, $ICl_3$ and IBr. The preferred halogens are $Cl_2$ and $Br_2$. The preferred interhalogens contain Br or Cl.

The chlorosilanes of step (E) are compounds which include trichlorosilane, methyldichlorosilane, ethyldichloro-silane n-propyldichlorosilane, iso-propyldichlorosilane, n-butyldichlorosilane, benzyldichlorosilane, parachlorobenzyldichlorosilane, toluyldichlorosilane, naphthalyldichlorosilane, vinyldichlorosilane, allyldichlorosilane, monomethylchlorosilane, diethylchlorosilane, methyl isopropylchlorosilane, methyl benzylchlorosilane, and dibenzylchlorosilane. Trichlorosilane is the preferred chlorosilane compound.

The Group IIIa hydrocarbyl dihalides (H) preferably are selected from the boron and aluminum alkyl dihalides. The alkyl group can have from 1 to 12 carbon atoms. Illustrative, but non-limiting examples of the Group IIIa metal alkyl halides are methyl aluminum dichloride, ethyl aluminum dichloride, propyl aluminum dichloride, butyl aluminum dichloride, isobutyl aluminum dichloride, pentyl aluminum dichloride, neopentyl aluminum dichloride, hexyl aluminum dichloride, octyl aluminum dichloride, decyl aluminum dichloride, dodecyl aluminum dichloride, methyl boron dichloride, ethyl boron dichloride, propyl boron dichloride, butyl boron dichloride, isobutyl boron dichloride, pentyl boron dichloride, neopentyl boron dichloride, hexyl boron dichloride, octyl boron dichloride, decyl boron dichloride and the like. The preferred Group III metal alkyl dihalides are ethyl aluminum dichloride and ethyl boron dichloride. Preferably, the treatment with the Group III metal alkyl dihalides will be for about 4 hours to 16 hours, however, greater or lesser time can be used for the treatment.

The organometallic compound (J) of a Group IIa, IIb or IIIa metal employed according to this invention is suitably selected from aluminum alkyls, aluminum alkyl hydrides, lithium aluminum alkyls, zinc alkyls, magnesium alkyls and the like. The preferred organoaluminum compounds for organometallic cocatalysts are those of the formula $AlR'_nX'_{3-n}$.

The aliphatic diene (K) employed according to this invention contains at least 4 carbon atoms and is a diene in which at least one of the double bonds is in a terminal position. Among dienes suitably used in this invention are butadiene, isoprene, 1,5-hexadiene, 1,7-octadiene, 1,9-octadiene dicyclopentadiene, ethylidene norbornene, or mixtures thereof. The $\alpha$-$\omega$-dienes such as 1,7-octadiene are preferred.

Preferably, the activated transition metal-containing basic catalyst component is prepared by contacting the solid inert support material in separate stages sequentially with the reaction product of the organometallic compound of the Group IIa, IIb or IIIa metal (B) with the oxygen-containing compound (C), followed by treatment with the acyl halide (D), reacting the product therefrom with the transition metal compound (F), treating the solid materials with the halogen compound (G) and finally, treating the solids with the aliphatic diene (K).

The treatment of the support material is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. Illustrative examples of useful solvents in addition to those mentioned above include, the alkanes, such as pentane, isopentane, hexane, heptane, octane and nonane; cycloalkanes such as cyclopentane and cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The organometallic component (B) employed either as the organometallic compound or its reaction product with the oxygen-containing compound is preferably added to the inert solvent in the form of a solution. Preferred solvents for the organometallic compositions are the alkanes such as hexane, heptane, octane and the like. However, the same solvent as employed for the inert particulate support material can be employed for dissolving the organometallic composition. The concentration of the organometallic composition in the solvent is not critical and is limited only by handling needs.

The amounts of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the organomagnesium compound concentration is in the range of 0.5 to 2.0 millimoles/g of support and more preferably in the range of 1.0 to 1.8 millimoles/g of support. The magnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen-containing compound and the mode of addition. When the oxygen-containing compound is not premixed with the magnesium compound, that is, when it is added to the support before the magnesium compound or after the magnesium compound, the ratio may range from 0.01 to 2.0. When premixed with the organomagnesium compound, the hydrocarbyl groups on the oxygen-containing compound to organomagnesium compound ranges from 0.01 to 1.0, most preferably 0.8 to 1.0.

The amount of acyl halide (D) employed should be such as to provide a mole ratio of about 0.1 to about 2.5 with respect to the magnesium compound. Preferably the mole ratio will be about 1 to about 2.

The transition metal halide (F) employed in the preparation of the catalyst should be such as to provide a catalyst comprising 1 weight percent titanium in the finally recovered product. However, greater or lesser amounts can be employed. The ratio of titanium to magnesium in the preparation of catalyst therefore should be in the amount of 0.1 to about 10 and preferably about 2 to about 4.

The transition metal compound is added to the inert support at a concentration of about 0.01 to about 1.5 millimoles Ti/g of dried support, preferably in the range of about 0.05 to about 1.0 millimoles Ti/g of dried support and especially in the range of about 0.1 to 0.8 millimoles Ti/g of dried support.

The halogen, interhalogen or chlorosilane treatment (A, E, G or I) is such as to provide an excess of the halogen or interhalogen. Generally, the halogen employed, such as for example $Cl_2$, is employed in the form of a gas. The halogen treatment of the catalyst can be accomplished by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can also be employed. The molar concentration of chlorine in the inert gas can range from 1 mole percent to 100 mole percent.

The Group IIIa metal hydrocarbyl dihalide (H) employed can be in the range of about 0.1 to about 10 mmoles per mole of magnesium compound with a preferred range of from 0.5 to 5.0.

Generally, the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction, constant agitation is desirable.

In the preparation of the titanium metal-containing solid catalyst component, washing after the completion of any step may be effected. However, intermediate drying as taught by U.S. Pat. No. 4,711,865 is preferred.

The catalyst components prepared in accordance with this invention are usefully employed with organometallic cocatalysts well known in the art of the Ziegler catalyst systems, and used together with the transition metal containing catalyst component. Such organometallic compounds are Group Ia, IIa, IIb and IIIa metal such as aluminum alkyls, aluminum alkyl hydrides, lithium aluminum alkyls, zinc alkyls, magnesium alkyls and the like. The cocatalysts preferably used are the organoaluminum compounds. The preferred organoaluminum compounds are alkylaluminum compounds represented by the formula $AlR'_n X'_{3-n}$ wherein R' is a hydrocarbyl or substituted hydrocarbyl group, X' is a halogen, and n is a number equal to or greater than 1 and less than or equal to 3. Preferably R' is an alkyl group having from 2 to 10 carbon atoms. Preferably the halogen is chlorine. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethylaluminum ethoxide and the like. Aluminum trialkyl compounds are most preferred with triiisobutylaluminum and aluminum triethyl being highly desirable.

The catalyst system comprising the aluminum alkyl cocatalyst and the transition metal containing solid catalyst component is usefully employed for the polymerization of ethylene. Typically the polymers will have melt indexes from 0.01–1.0 and MIR from about 20 to about 40. The olefins can be polymerized in the presence of the catalysts of this invention by any suitable known process such as, for example, solution, slurry or gas-phase processes.

The polymerization reaction employing effective amounts of the above-mentioned supported catalyst system can be carried out under conditions well known in the art of Ziegler polymerization, for example, in solution or slurry processes at a temperature in the range of 50° C. to 200° C. and at a pressure of 1 to 40 atmospheres, typically at temperatures from 80° C. to 200° C. and pressures from 10–30 atmospheres, and in the gas phase, at a temperature range of 70° to 100° C. at pressures in the range of about 1 to 50 atmospheres and upward, typically 18 atmospheres. Illustrative of the gas-phase processes are those disclosed in U.S. Pat. No. 4,302,565 and U.S. Pat. No. 4,302,566, which references are hereby incorporated in their entirety by reference. As indicated above, one advantageous property of the catalyst system of this invention is the reduced amount of gas-phase reactor fouling. The catalyst system can also be used to polymerize olefins at single-phase conditions, i.e., 150° C. to 320° C. and 1,000–3,000 atmospheres. At these conditions the catalyst lifetime is short by the activity sufficiently high that removal of catalyst residues from the polymer is unnecessary. However, it is preferred that the polymerization be done at pressures ranging from 1 to 50 atmospheres, preferably 5 to 25 atmospheres.

The catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples, below, it is understood that these are only for illustrative purposes. Many alternatives, modifications and variations will be apparent to those skilled in the art in light of the examples below and such apparent alternatives, modifications and variations are within the scope of the claims.

In the examples following, the silica support was prepared by placing Davison Chemical Company G-952 silica gel in a vertical column and fluidizing with an upward flow of $N_2$. The column was slowly heated to between 400° and 800° C. and held at that temperature for 12 hours after which the silica was cooled to ambient temperature.

The melt index (MI) and the melt index ratio (MIR) ($I^{21}/I^2$) are measured in accordance with ASTM test D1238. The resin density was determined by density gradient column according to ASTM test D1505.

COMPARATIVE EXAMPLES 1 AND 2

Into a vial containing 20 ml of hexane was injected 10 ml of butylethylmagnesium (BEM) (6.8 mmoles Mg). To this solution was added 0.5 ml (6.8 mmoles) of n-butanol followed by reaction at room temperature for 1.5 hours. The solution was syringed into a vial containing 3.5 grams of Davison 952 silica and allowed to react for one hour at room temperature. 6.8 mmoles of benzoyl chloride was added while stirring and stirring was continued at room temperature for one hour. $TiCl_4$ was then added (2.3 mmoles Ti) and reacted at room temperature for one hour. The vial was then connected to a chlorine gas cylinder, pressurized to 7.5 psig and allowed to react for one hour at room temperature. At the end of this time period, the vial was purged with nitrogen to remove the residual chlorine and filtered. After washing with hexane, the catalyst was dried in vacuo. The final catalyst was cream colored and was found to contain 1.13 weight percent Ti.

POLYMERIZATION

To a 2.1 liter reactor there is added 800 cc of isobutane, and 3.1 mmoles of triethyl aluminum cocatalyst (to provide an aluminum to titanium ratio of about 88:1). The vessel is pressured with 75 mmoles of $H_2$, is thereafter pressured to 325 total psig with ethylene, and is then heated to 80° C., after which 0.15 g of the titanium-containing solid catalyst component is added to the reactor by means of a solids injector. Polymerization is maintained for 40 minutes.

A second polymerization run is performed under the same conditions. The results of the polymerization runs are summarized in Examples 1 and 2 in Table 1.

EXAMPLES 3, 4 AND 5

The titanium containing solid reaction product catalyst component is prepared as described in Example 1. The polymerization conditions are identical, except that 1,7-octadiene is added to the reactor with the isobutane before pressurization with hydrogen and ethylene. Varying quantities of 1,7-octadiene are added for each of Examples 3, 4 and 5, as shown in Table 1. The results of these three polymerization runs are summarized in Table I.

TABLE I

| Example No. | Diene (ml) | Yield (g) | MI | HLMI | MIR | Resin Density (g/cc) |
|---|---|---|---|---|---|---|
| 1 | 0 | 56 | 0.33 | 10.8 | 32.7 | 0.9584 |
| 2 | 0 | 59 | 0.31 | 10.0 | 32.2 | — |
| 3 | 4.0 | 99 | 0.42 | 14.2 | 34.0 | 0.9545 |
| 4 | 7.0 | 118 | 0.39 | 13.3 | 34.1 | — |
| 5 | 10.0 | 119 | 0.52 | 18.5 | 35.6 | 0.9511 |

As seen from Table I, product yield is significantly increased by addition of small amounts of 1,7-octadiene. Yield is almost 75% better in Example 3 and is doubled in Examples 4 and 5, while resin density is not significantly reduced. Other indicia of polymer properties are not significantly changed.

I claim:

1. A transition metal-containing catalyst component comprising the reaction product obtained by:
    (I) treating an inert solid support material in an inert solvent sequentially with at least:
        an organometallic compound (B) of a Group IIa, IIb or IIIa metal wherein all the metal valencies are satisfied with a hydrocarbyl group,
        an oxygen-containing compound (C) selected from alcohols, aldehydes, ketones, siloxanes, or mixtures thereof,
        at least one transition metal compound (F) of a Group IVb, Vb, VIb or VIII metal, or mixtures thereof, and
    (II) treating the solid material resulting from step (I) with from about 0.01 to about 3,000 mole of an aliphatic diene (K) per gram atom of the transition metal of the transition metal compound (F), said diene having at least 4 carbon atoms and at least one terminal double bond.

2. The transition metal-containing catalyst component of claim 1 wherein the organometallic compound (B) is a dihydrocarbyl magnesium compound and each hydrocarbyl group is the same or different and is an alkyl, aryl, cycloalkyl, aralkyl, alkadienyl, or an alkenyl.

3. The transition metal-containing catalyst component of claim 1 wherein the transition metal compound (F) is represented by the formula $TrX'_{4-q}(OR^6)_q$, $TrX'_{4-q}R_q^7$, $VOX'_3$, or $VO(OR^6)_3$ wherein Tr is a transition metal, $R^6$ is a hydrocarbyl group having from 1 to 20 carbon atoms, $R^7$ is an alkyl group, aryl group or aralkyl group having from 1 to 20 carbon atoms or a 1,3-cyclopentadienyl, X' is halogen and q is 0 or a number equal to or less than 4.

4. The transition metal-containing catalyst component of claim 3 wherein prior to treating with the transition metal compound (F) the inert support material which has been treated with the organo-metallic compound (B) and oxygen-containing compound (C) is treated with an acyl halide (D) represented by the formula $R^8COX$ wherein $R^8$ is an alkyl, cycloalkyl, or aryl group having from 1 to 12 carbon atoms and X is a halogen.

5. The transition metal-containing catalyst of claim 1 wherein the aliphatic diene (K) is butadiene, isoprene, 1,4-hexadiene, 1,5-hexadiene, 1,7-octadiene, 1,9-octadiene dicyclopentadiene, ethylidene norbornene, or mixtures thereof.

6. The transition metal-containing catalyst of claim 3 wherein the organometallic compound (B) is a dihydrocarbyl magnesium compound wherein each hydrocarbyl group is the same or different and is an alkyl, aryl, cycloalkyl, aralkyl, alkadienyl, or alkenyl group; and wherein the oxygen-containing compound (C) is an alcohol or ketone.

7. The transition metal-containing compound of claim 6 wherein prior to treating with the transition metal compound (F) the inert support material which has been treated with the organo-metallic compound (B) and oxygen-containing compound (C) is treated with an acyl halide (D) represented by the formula $R^8COX$ wherein $R^8$ is an alkyl, cycloalkyl, or aryl group having from 1 to 12 carbon atoms and X is a halogen.

8. The transition metal-containing catalyst component of claim 7 wherein Tr is titanium, vanadium or zirconium.

9. The transition metal-containing catalyst component of claim 8 wherein the transition metal compound (F) is $TiCl_4$.

10. The transition metal-containing catalyst component of claim 9 wherein organometallic compound (B) is butylethylmagnesium, the oxygen-containing compound (C) is 1-butanol, the acyl halide (D) is benzoylchloride, and following treatment with the transition metal compound (F) the inert support material is treated with $Cl_2$.

11. The transition metal-containing catalyst component of claim 10 wherein the aliphatic diene is an $\alpha$-$\omega$-diene.

12. The transition metal-containing catalyst component of claim 11 wherein the aliphatic diene is 1,7-octadiene.

13. A transition metal-containing catalyst component comprising the reaction product obtained by:
  (I) treating an inert solid support material in an inert solvent with: an organometallic compound (B) of a Group IIa, IIb or IIIa metal wherein all the metal valencies are satisfied with a hydrocarbyl group; an oxygen-containing compound (C) selected from alcohols, aldehydes, ketones, siloxanes, or mixtures thereof; an acyl halide (D); at least one transition metal compound (F) of a Group IVb, Vb, VIb or VIII metal; optionally, (G) $Cl_2$, $Br_2$, an interhalogen, or mixtures thereof; and optionally, an organometallic compound (J) of a Group IIa, IIb or IIIa metal; wherein the treating sequence of the inert solid support material is
   (i) simultaneously with the organometallic compound (B) and the oxygen-containing compound (C),
   (ii) with the reaction product of the organometallic compound (B) and the oxygen-containing compound (C), or
   (iii) with the oxygen-containing compound (C) followed next by the organometallic compound (B); and
  (II) treating the solid material resulting from step (I) with from about 0.01 to about 3,000 mole of an aliphatic diene (K) per gram atom of the transition metal of the transition metal compound (F), said diene having at least 4 carbon atoms and at least one terminal double bond.

14. The transition metal-containing catalyst of claim 13 wherein the aliphatic diene (K) is selected from butadiene, isoprene, 1,4-hexadiene, 1,5-hexadiene, 1,7-octadiene, 1,9-octadiene dicyclopentadiene, ethylidene norbornene, or mixtures thereof.

15. The transition metal-containing catalyst of claim 13 wherein the organometallic compound (B) is a dihydrocarbyl magnesium compound each hydrocarbyl group of which is the same or different and is an alkyl, aryl, cycloalkyl, aralkyl, alkadienyl, or alkenyl group; the oxygen-containing compound (C) is selected from alcohols or ketones, the transition metal compound (F) is represented by the formula $TrX'_{4-q}(OR^6)_q$, $TrX'_{4-q}R_q^7$, $VOX'_3$ or $VO(OR^6)_3$ wherein Tr is a transitional metal, $R^6$ is a hydrocarbyl group having from 1 to 20 carbon atoms, $R^7$ is an alkyl, aryl, or aralkyl group having from 1 to 20 carbon atoms or a 1,3-cyclopentadienyl, X' is halogen and q is 0 or a number equal to or less than 4.

16. The transition metal-containing catalyst compound of claim 15 wherein the acyl halide (D) is represented by the formula $R^8COX$ wherein $R^8$ is an alkyl, cycloalkyl, or aryl group having from 1 to 12 carbon atoms and X is a halogen.

17. The transition metal-containing catalyst component of claim 16 wherein the transition metal compound (F) is $TiCl_4$.

18. The transition metal-containing catalyst component of claim 17 wherein the organometallic compound (B) is butylethylmagnesium, the oxygen-containing compound (C) is 1-butanol, the acyl halide (D) is benzoylchloride, and following treatment with the transition metal compound (F) the inert support material is treated with $Cl_2$.

19. The transition metal-containing catalyst component of claim 18 wherein the aliphatic diene (K) is an $\alpha$-$\omega$-diene.

20. The transition metal-containing catalyst component of claim 19 wherein the aliphatic diene (K) is 1,7-octadiene.

21. A transition metal-containing solid prepolymerized catalyst component comprising the prepolymerized solid reaction product obtained by:
  (I) treating an inert solid support material in an inert solvent sequentially with at least:
    an organometallic compound (B) of a Group IIa, IIb or IIIa metal wherein all the metal valencies are satisfied with a hydrocarbyl group,
    an oxygen-containing compound (C) selected from alcohols, aldehydes, ketones, siloxanes, or mixtures thereof,
    at least one transition metal compound (F) of a Group IVb, Vb, VIb or VIII metal,
  (II) prepolymerizing the solid material resulting from step (I) with a minor amount of ethylene in the presence of from about 0.01 to about 3,000 mole of an aliphatic diene (K) per gram atom of the transition metal of the transition metal compound (F), said diene having at least 4 carbon atoms and at least one terminal double bond.

22. The transition metal-containing catalyst of claim 21 wherein the aliphatic diene (K) is selected from butadiene, isoprene, 1,4-hexadiene, 1,5-hexadiene, 1,7-octadiene, 1,9-octadiene dicyclopentadiene, ethylidene norbornene, or mixtures thereof.

23. The transition metal-containing catalyst of claim 22 wherein the organometallic compound (B) is a dihydrocarbyl magnesium compound in which each hydrocarbyl is the same or different and is an alkyl, aryl, cycloalkyl, aralkyl, alkadienyl, or alkenyl groups; the oxygen-containing compound (C) is selected from an alcohol or ketone; and the transition metal compound is represented by the formula $TrX'_{4-q}(OR^6)_q$, $TrX'_{4-q}R_q^7$, $VOX'_3$ or $VO(OR^6)_3$ wherein Tr is a transition metal, $R^6$ is a hydrocarbyl group having from 1 to 20 carbon atoms, $R^7$ is an alkyl, aryl, or aralkyl group having from 1 to 20 carbon atoms or a 1,3-cyclopentadienyl, X' is halogen and q is 0 or a number equal to or less than 4.

24. The transition metal-containing compound of claim 23 wherein prior to treating with the transition metal compound (F) the inert support which has been treated with the organo-metallic compound (B) and oxygen-containing compound (C) is treated with an acyl halide (D) represented by the formula $R^8COX$ wherein $R^8$ is an alkyl, cycloalkyl, or aryl group having from 1 to 12 carbon atoms and X is a halogen.

25. The transition metal-containing catalyst component of claim 24 wherein the transition metal compound (F) is $TiCl_4$.

26. The transition metal-containing catalyst component of claim 25 wherein the organometallic compound (B) is butylethyl-magnesium, the oxygen-containing compound (C) is 1-butanol, the acyl halide (D) is benzoylchloride, and following treatment with the transition metal compound (F) the inert support material is treated with $Cl_2$.

27. The transition metal-containing catalyst component of claim 26 wherein the aliphatic diene is an $\alpha$-$\omega$-diene.

28. The transition metal-containing catalyst component of claim 27 wherein the aliphatic diene is 1,7-octadiene.

29. A transition metal-containing solid prepolymerized catalyst component comprising the reaction product obtained by:
(1) treating an inert solid support material in an inert solvent with:
an organometallic compound (B) of a Group IIa, IIb or IIIa metal wherein all the metal valencies are satisfied with a hydrocarbyl group;
an oxygen-containing compound (C) selected from alcohols, aldehydes, ketones, siloxanes, or mixtures thereof;
an aryl halide (D);
at least one transition metal compound (F) of a Group IVb, Vb, VIb or VIII metal;
optionally, $Cl_2$, $Br_2$, an interhalogen, or mixtures thereof (G); and
optionally, an organometallic compound (J) of a Group IIa, IIb or IIIa metal; wherein the treating sequence of the inert solid support material is
(i) simultaneously with the organometallic compound (B) and the oxygen-containing compound (C),
(ii) with the reaction product of the organometallic compound (B) and the oxygen-containing compound (C), or
(iii) with the oxygen-containing compound (C) followed next by the organometallic compound (B); and
(II) reacting the solid material resulting from step (I) with a minor amount of ethylene in the presence of from about 0.01 to about 3,000 mole of an aliphatic diene (K) per gram atom of the transition metal of the transition metal of compound (F), said diene having at least 4 carbon atoms and at least one terminal double bond.

30. The transition metal-containing catalyst of claim 29 wherein the aliphatic diene (K) is selected from butadiene, isoprene, 1,4-hexadiene, 1,5-hexadiene, 1,7-octadiene, 1,9-octadiene dicyclopentadiene, ethylidene norbornene, or mixtures thereof.

31. The transition metal-containing catalyst of claim 30 wherein the organometallic compound (B) is a dihydrocarbyl magnesium compound each hydrocarbyl group of which is the same or different and is an alkyl, aryl, cycloalkyl, aralkyl, alkadienyl, or alkenyl group; the oxygen-containing compound (C) is selected from alcohols or ketones, the transition metal compound (F) is represented by the formula $TrX'_{4-1}(OR^6)_q$, $TrX'_{4-q}R_q^7$, $VOX'_3$ or $VO(OR^6)_3$ wherein Tr is a transitional metal, $R^6$ is a hydrocarbyl group having from 1 to 20 carbon atoms, $R^7$ is an alkyl, aryl, or aralkyl group having from 1 to 20 carbon atoms or a 1,3-cyclopentadienyl, X' is halogen and q is 0 or a number equal to or less than 4.

32. The transition metal-containing compound of claim 31 wherein the acyl halide (D) is represented by the formula $R^8COX$ wherein $R^8$ is an alkyl, cycloalkyl, or aryl group having from 1 to 12 carbon atoms and X is a halogen.

33. The transition metal-containing catalyst component of claim 32 wherein the aliphatic diene (K) is $\alpha$-$\omega$-diene.

34. The transition metal-containing catalyst component of claim 33 wherein the aliphatic diene (K) is 1,7-octadiene.

35. A transition metal-containing pre-reduced catalyst component comprising the pre-reduced reaction product obtained by:
(I) treating an inert solid support material in an inert solvent sequentially with:
(A) optionally, $Cl_2$, $Br_2$, an interhalogen, or mixtures thereof;
(B) an organometallic compound of a Group IIa, IIb or IIIa metal wherein all the metal valencies are satisfied with a hydrocarbyl group;
(C) an oxygen-containing compound selected from alcohols, aldehydes, ketones, siloxanes, or mixtures thereof;
(D) an acyl halide;
(F) at least one transition metal compound of a Group IVb, Vb, VIb or VIII metal; and
(G) optionally, $Cl_2$, $Br_2$, an interhalogen, or mixtures thereof,
with the provisions that at least one of steps (A) and (G) is employed, and with the further provision that the inert solid support material can be treated alternatively
(i) simultaneously with the organometallic compound (B) and the oxygen-containing compound (C),
(ii) with the reaction product of the organometallic compound (B) and the oxygen-containing compound (C), or
(iii) with the oxygen-containing compound (C) followed next by the organometallic compound (B); and
(II) pre-reducing the solid material resulting from step (I) with an organometallic compound of a Group IIa, IIb or IIIa metal in the presence of from about 0.01 to about 3,000 mole of an aliphatic diene (K) per gram atom of transition metal from the transition metal of compound (F), said diene having at least 4 carbon atoms and at least one terminal double bond.

36. The transition metal-containing catalyst of claim 35 wherein the (B) organometallic compound is a dihydrocarbyl magnesium compound in which each hydrocarbyl group is the same or different and is an alkyl, aryl, cycloalkyl, aralkyl, alkadienyl, or alkenyl group; the oxygen-containing compound (C) is an alcohol or ketone, and the transition metal compound (F) is represented by the formula $TrX'_{4-1}(OR^6)_q$, $TrX'_{4-q}R_q^7$, $VOX'_3$ or $VO(OR^6)_3$ wherein Tr is a transitional metal, $R^6$ is a hydrocarbyl group having from 1 to 20 carbon atoms, $R^7$ is an alkyl, aryl, or aralkyl group having from 1 to 20 carbon atoms or a 1,3-cyclopentadienyl, X' is halogen and q is 0 or a number equal to or less than 4.

37. The transition metal-containing catalyst component of claim 36 wherein the transition metal compound (F) is $TiCl_4$.

38. The transition metal-containing catalyst component of claim 37 wherein the organometallic compound (B) is butylethyl- magnesium, the oxygen-containing compound (C) is 1-butanol, the acyl halide (D) is benzoylchloride, and following treatment with the transition metal compound (F) the inert support material is treated with $Cl_2$.

39. The transition metal-containing catalyst component of claim 38 wherein the aliphatic diene (K) is an α-ω-diene.

40. The transition metal-containing catalyst component of claim 39 wherein the aliphatic diene is 1,7-octadiene.

* * * * *